United States Patent Office 3,324,090
Patented June 6, 1967

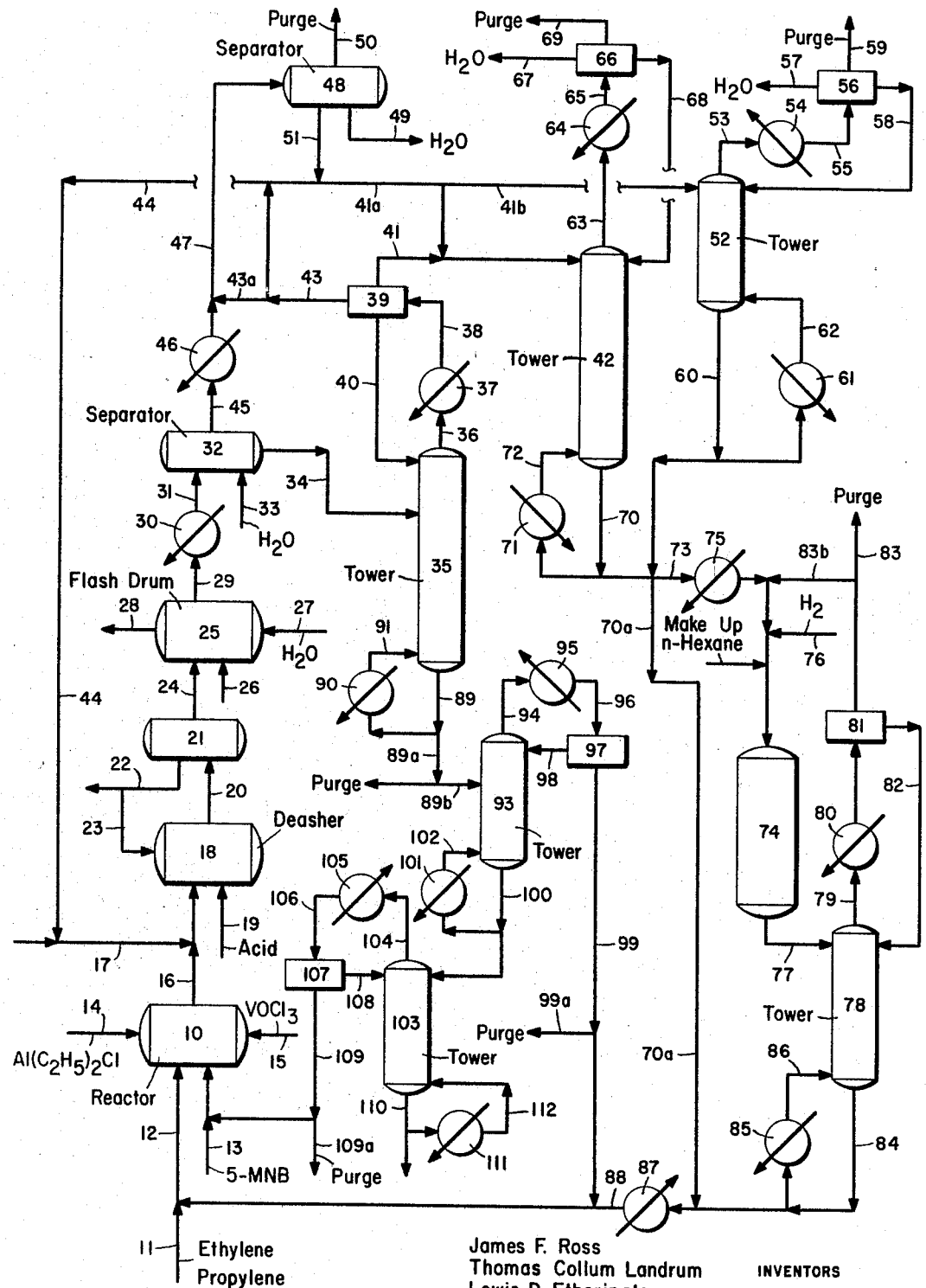

3,324,090
POLYMERIZATION DILUENT TREATMENT
James F. Ross, Bay Village, Ohio, Thomas Collum Landrum, Baton Rouge, La., and Lewis D. Etherington, Westfield, N.J., assignors to Esso Research and Engineering Company, a corporation of Delaware
Filed Dec. 2, 1963, Ser. No. 327,230
16 Claims. (Cl. 260—80.5)

This invention relates to the purification of diluents used in the polymerization of olefins and more particularly relates to the purification of contaminated recycle diluents.

Hydrocarbon diluents recovered from the polymerization of olefins are usually contaminated with various oily olefinic compounds, i.e., other than those sought to be polymerized, that are formed as by-products during the course of the polymerization reaction. Additionally, the hydrocarbon diluents which are usually employed in the polymerization reaction may contain dilute acids or chelating agents such as acetyl acetone that are used to help remove catalyst residues from polymerization reaction mixtures. The hydrocarbon diluents also may contain antisolvents such as water or $C_1$ to $C_8$ alkanols that are used to digest catalyst residues and sometimes to precipitate the polymer product from the diluent. Inasmuch as all of the aforementioned materials act as catalytic poisons in varying degrees, the hydrocarbon diluent cannot be efficiently reused in the polymerization reaction, unless substantially all of these poisons have either been removed from the diluent or rendered innocuous.

Substantially all of any alkanol or water present in the diluent can be removed by rectifying the contaminated diluent mixture, and processes for the removal of the contaminating chelating agents are well known to the art, e.g., see U.S. Patent 2,980,742, issued Apr. 18, 1961, to James F. Ross, Bruce R. Tegge and Leon C. Kenyon, Jr. However, significant quantities of the contaminating olefinic compounds formed during the course of the polymerization reaction will be found in the hydrocarbon diluent stream from the rectifier particularly when (a) the hydrocarbon diluent is a saturated compound, i.e. an alkane or cycloalkane, and (b) the contaminating olefinic compounds are those having boiling points near that of the hydrocarbon diluent.

One technique previously proposed to remove the olefinic contaminants from the hydrocarbon diluent stream was the treatment of the stream with aluminum chloride. However, this technique is inconvenient since copious quantities of hydrogen chloride are evolved during the course of the treatment and the disposition of the spent $AlCl_3$ presents serious waste disposal problems. Furthermore, if the polymerization reaction is carried out as a copolymerization of one or more monoolefins with a nonconjugated diolefin, any unreacted nonconjugated diolefin in the stream is complexed with the aluminum chloride thus preventing recovery of the diolefin. Another technique well known to the art is adsorption with alumina, silica gel, molecular sieves, etc. However, adsorption techniques give rise to formidable process problems inasmuch as the adsorbents (a) possess a low capacity and selectivity for olefins having a boiling point near that of the diluent, (b) convert any unreacted nonconjugated diolefin present in the diluent stream to low molecular weight oligomers, i.e. dimers, trimers, etc., thus barring recovery and reuse of the nonconjugated diolefins, and (c) require high temperatures for regeneration.

Accordingly, an object of the present invention is to provide a process for the removal of olefinic contaminates normally present in the diluent mixture after the polymerization reaction has been completed. Other objects will become apparent in the following description and claims.

The contaminated diluent mixture is generally obtained by deashing the polymerization reaction mixture (to remove catalyst residues) by processes well known to the art and contacting the resultant deashed reaction mixture with steam thereby obtaining a water slurry of the deashed polymer and a vaporized hydrocarbon diluent mixture. It should be realized, however, that the steps of deashing the reaction mixture and the subsequent vaporization of the diluent mixture does not constitute a part of this invention.

The objects of this invention are accomplished by a combination of steps which affords a result heretofore unobtainable in the prior art and comprises:

(a) Partially condensing the vaporized diluent mixture so as to recover a diluent-rich organic phase and a monomer-rich gasiform phase;

(b) Distilling at least a portion of the diluent-rich organic phase to take as an overhead product, a stream comprising a major portion of the hydrocarbon diluent and a major portion of olefins having a boiling point near and below that of the diluent, and as a bottoms product a stream comprising a major portion of olefins having a boiling point higher than that of the diluent and a minor portion of the diluent;

(c) Stripping the overhead product in a fractionating tower to remove unreacted $C_2$ and $C_3$ monomers which are not to be hydrogenated, water, and organic chlorides from the diluent that are also polymerization catalyst poisons and not desired in the feed to the next step;

(d) Hydrogenating at least part of the dried, stripped overhead product thereby obtaining a hydrogenated mixture comprising the diluent and saturated isomers of the diluent;

(e) Recycling the nonhydrogenated portion of the dried overhead product to the polymerization reaction zone;

(f) Recycling the hydrogenated mixture to the polymerization reaction zone after removing unreacted hydrogen. If the polymerization reaction is conducted in the presence of one or more monoolefins and a nonconjugated diolefin, any unreacted nonconjugated diolefin, usually higher boiling than the diluent, can be recovered for reuse in the polymerization reaction by redistilling the bottoms product; and (g) Further condensation of the said gasiform phase to recover more of the diluent that is dried and recycled to the polymerization reaction zone. This diluent portion is made lean in heavy olefinic catalyst poisons by the partial condensation of step (a), and need not be fractionated for further removal of these materials.

The combination of these steps and the order in which they occur is unique in that (1) distillation of the total vaporized diluent mixture without condensation requires expensive large-diameter towers; (2) distillation of totally condensed polymerization diluent mixture requires large towers, exchangers and high energy input requirements in order to separate the polymerization poisons; (3) distillation alone without hydrofining would not remove olefinic contaminants whose boiling points are near that of the diluent employed in the polymerization process; and (4) hydrogenation of the entire polymerization reaction mixture without any previous distillation results in reduced hydrofining efficiency and necessitates the use of large amounts of the hydrogenation catalyst, and the resultant hydrogenated stream contains significant quantities of high boiling paraffins. Without fractionation these materials have no process outlet except in diluent leakage, and would build up in concentration in the recycle diluent; these high boiling paraffins, when recycled to the reaction zone are retained by the products as volatiles and cause undesirable "blistering" of the polymeric products during end-use processing. Furthermore, total hydrogenation of the polymerization reaction mixture, in the absence of any previous distillation, converts any unreacted nonconjugated diolefin employed in the polymerization process to its respective paraffinic isomer; since these diolefins are often quite expensive, any process which prevents their recovery may be economically unsound.

The diluents purified by the present invention are usually saturated hydrocarbons, i.e., the alkanes and cycloalkanes, having from 5 to 8 carbon atoms. Representative nonlimiting examples include n-pentane, isopentane, n-hexane, 2-methylpentane, 3-methylpentane, n-heptane, 2-methylhexane, 3-methylhexane, 2-dimethylpentane, n-octane, 2-methylheptane, cyclopentane, cyclohexane, cycloheptane and the like. Preferably, the diluent boils intermediate between the diolefin and the alpha olefin. The process of this invention is especially useful for the removal of oily olefinic contaminants that poison the polymerization catalyst and which can be formed as by-products during the copolymerization of ethylene with other polymerizable olefins in the production of solid rubber products. The preparation of ethylene/olefin copolymers is well known in the art and has been described in British Patent 880,904, French Patent 1,285,090, French Patent 1,302,960, U.S. Patent 3,000,866 and U.S. Patent 3,063,973.

The copolymerization reaction, which does not comprise a part of this invention, is generally carried out by contacting a feed stream containing ethylene and other polymerizable olefins to be described hereinafter with a Ziegler polymerization catalyst in the presence of an inert saturated hydrocarbon diluent having 5 to 8 carbon atoms, i.e., an alkane or cycloalkane such as n-petane, isopentane, n-hexane, isohexane or n-octane. The feed stream is allowed to remain in contact with the catalyst for a period of time which usually does not exceed 5 hours at a temperature in the range of −20° to 150° C., preferably 0 to 80° C. As a matter of convenience, the copolymerization reaction is carried out at about 1 to 5 atmospheres pressure; however, pressures as high as 1000 p.s.i. can be employed if desired.

The polymerization catalyst utilized in the preparation of these copolymers comprise a heavy reducible transition metal compound of a Group IV–B, V–B, VI–B and VIII metal of the Periodic System and an organometal compound of a Group I–A, II–A and III–A metal of the Periodic System. The Periodic System employed in describing this invention is that which appears in "The Merck Index," Merck & Co., Inc., Rahway, N.J., seventh edition (1960). The preferred Ziegler catalyst is usually prepared by mixing a vanadium compound which can be represented by a general formula $VO_nX_{4-n}$, where $n$ is an integer of zero to one and X is a halogen having an atomic number of at least 17 (i.e. X is selected from the group consisting of chlorine, bromine and iodine), with an organoaluminum compound having reducing properties. The organoaluminum compound can be conveniently represented by the general formula $R_{3-z}AlX_z$, where R is a $C_1$–$C_{12}$ alkyl radical such as ethyl, isopropyl, isobutyl, octyl, and the like, $z$ is an integer of zero to two and X is a halogen having an atomic number of at least 17. Preferred examples of the vanadium compound include vanadium tetrachloride and vanadium oxytrichloride; the preferred organoaluminum compounds are aluminum triethyl, aluminum diethyl chloride, aluminum sesquichloride and aluminum triisobutyl. The relative proportions of the vanadium compound and the organoaluminum compound can be varied so that the molar ratio of aluminum to vanadium ranges between about 2:1 to 10:1. The preferred concentrations of the vanadium compound in the reaction zone range between 0.003 to 0.03 weight percent based on the diluent; however, higher or lower concentrations can be employed if desired. When the reaction is carried out on a continuous basis, the polymerization catalyst is preferably prepared in situ, i.e. the catalyst components are added separately to the polymerization reactor that contains a hydrocarbon diluent of the type described above, the feed stream is introduced into the reactor, and the catalyst components are allowed to be admixed as the polymerization reaction proceeds. Upon completion of the polymerization reaction, the copolymer is generally deashed in order to remove catalyst residues, by the addition of a $C_1$ to $C_4$ alkanol such as methanol, isopropanol, n-butanol and the like, or a dilute aqueous acid such as $H_2SO_4$, and is finished by techniques now well known to the art.

The second monomer which can be employed in the polymerization reaction comprises at least one higher alpha olefin having the general formula $R'$—$CH$=$CH_2$ where R' is a $C_1$–$C_8$ alkyl radical; preferably R' is a $C_1$–$C_4$ alkyl radical such as methyl, ethyl, isopropyl, n-butyl and the like. The alpha olefin can be linear or branched and while a single alpha olefin is preferable, mixtures of alpha olefins can be employed. Nonlimiting examples of suitable alpha olefins include propylene, 1 butene, 1-pentene, 1-hexene, 1-octene, 1-decene, 4-methyl-1-hexene, 5-methyl-1-hexene, 4,4-dimethyl-1-pentene, 5-methyl-1-heptene, 4,4-dimethyl-1-hexene, 5,6,6-trimethyl-1-heptene, and the like.

The third monomer that can be employed in the polymerization reaction is a nonconjugated diolefin having from 6 to 16 carbon atoms. Respective nonlimiting examples of the nonconjugated diolefin, which is either a linear or cyclic hydrocarbon, include 1,5-hexadiene; 1,5-octadiene; the 2-alkylnorbornadienes such as 2-methylnorbornadiene, 2-isopropylnorbornadiene, 2-(3-methylbutyl)-norbornadiene, 2-neopentylnorbornadiene, 2-n-dodecyl-norbornadiene; 5-methylene-2-norbornene; dicyclopentadiene; the 5-alkenyl-2-norbornenes such as 5-(1-propenyl)-2-norbornene; bicyclo-(2,2,1)-hepta-2,5-diene; unsaturated derivatives of bicyclo-(2,2,2)-octane including bicyclo-(2,2,2)-octa-2,5-diene; unsaturated derivatives of bicyclo-(3,2,1)-octane; unsaturated derivatives of bicyclo-(3,3,1)-nonane; unsaturated derivatives of bicyclo-(3,2,2)-nonane; 4,7,8,9-tetrahydroindene and its lower alkyl derivatives, and the like.

In a typical copolymer, the ethylene monomer unit concentration ranges in general from about 20% to about 75% by weight, the alpha olefin unit concentration ranges in general from about 25% to about 80% by weight while the concentration of the nonconjugated diolefin monomer unit, if a nonconjugated diolefin is employed in the copolymerization reaction, ranges in general from about 2% to about 20% by weight. Representative nonlimiting examples of the rubbery copolymers which can be prepared by copolymerizing the monomers described above include:

ethylene/propylene copolymer,
ethylene/propylene/dicyclopentadiene terpolymer,
ethylene/propylene/5 - methylene - 2-norbornene terpolymer,
ethylene/propylene/hexene-1-/dicyclopentadiene quaterpolymer,
ethylene/propylene/4,7,8,9-tetrahydroindene terpolymer,
ethylene/propylene/hexadiene-1,5 terpolymer and the like.

To more fully understand the invention, reference will be made to the drawing which is a diagrammatic flow plan of the diluent purification process in accordance with this invention. By way of example and not by way of limitation, n-hexane is used as the polymerization diluent, ethylene, propylene and 5-methylene-2-norbornene (which appears as 5-MNB in the drawing) are employed as the monomers, vanadium oxytrichloride and aluminum diethyl chloride are employed as the catalyst components and dilute sulfuric acid is used as the deashing agent. It is, of course, understood that other hydrocarbon diluents, other monomers, other catalyst components, and other polymer deashing and precipitating agents in accordance with the invention can be used in place of those mentioned in the drawing.

Turning now to the drawing, the numeral 10 designates a polymerization reaction zone provided with a suitable agitating means mounted within the reactor. A feed stream composed of ethylene and propylene is introduced via line 11 into line 12, admixed therein with anhydrous n-hexane that is essentially free of olefins, and introduced into reactor 10 as a liquid stream. The third monomer, i.e. 5-methylene-2-norbornene (5-MNB) is diluted with anhydrous n-hexane essentially free of olefins and added to reactor 10 as a liquid stream through line 13. The catalyst components, i.e. aluminum diethyl chloride and vanadium oxytrichloride, diluted with anhydrous n-hexane essentially free of olefins, are then added separately, in turn, to reactor 10 through lines 14 and 15 respectively.

After sufficient reaction time, copolymerization of the monomers occurs in reaction zone 10 whereby a solution of the copolymer in the catalyst containing diluent (i.e. n-hexane) is formed. The solution is discharged from reaction zone 10 by way of line 16 and is diluted with an additional quantity of recycle or makeup n-hexane which is introduced through line 17 prior to the passage of the slurry from reactor 10 into deasher 18. Preferably the diluent in line 17 also contains a small amount of alcohol in order to inactivate the catalyst and to facilitate subsequent catalyst rejection. The polymer solution is then digested in deasher 18 with a dilute acid which is introduced through line 19; the digestion process in deasher 18 facilitates removal of spent catalyst residues from the copolymer cement.

The deashed reaction mixture is discharged from deasher 18 through line 20 into separator 21 wherein the aqueous acid phase, containing spent catalyst residues and any alcohol which may have been added to the copolymer slurry through line 17, is removed from the polymerization reaction mixture by way of line 22; the thus separated aqueous acid phase may be discarded or treated for alcohol recovery and at least a portion thereof recycled to deasher 18 through line 23.

The substantially catalyst-free polymerization mixture is discharged from separator 21 through line 24 into flash drum 25 wherein the reaction mixture is vaporized in the presence of steam and hot water that are introduced into flash drum 25 by way of lines 26 and 27 respectively. The vaporization process occurring in flash drum 25 results in the production of a water slurry of the copolymer which is removed through line 28 and reserved for finishing by techniques well known to the art.

The vaporized remainder of the polymerization mixture, containing steam, unreacted monomers, oily olefinic contaminants, organic chloride contaminants formed as by-products during polymerization, traces of any residual alcohol which may have been used for rejection of catalyst residues, and n-hexane, is fed from flash drum 25, as a vapor stream, through line 29 to cooler 30 wherein it is partially condensed. Cooler 30 operates at a temperature of about 100° to 170° F. and a pressure of about 4 to 50 p.s.i.g. The partially condensed diluent mixture then passes via line 31 into phase separator 32 and is separated therein into a first liquid water phase, a first liquid diluent-rich organic phase and a first gasiform phase.

The first liquid water phase is removed from separator 32 via line 33 and may be discarded or reused at various points in the process, e.g., at deasher 18, flash drum 25, etc.

The first liquid diluent-rich organic phase in separator 32, containing about 25 to 70%, preferably 30 to 50%, of the n-hexane present in line 29, is fed to an intermediate tray of the fractionating tower 35 through line 34. Tower 35, operated at a temperature in the range of 160° to 275° F. and a pressure in the range of 5 to 70 p.s.i.g., contains suitable vapor-liquid contacting devices of any type well known in the art as well as suitable reboiling and refluxing means.

The feed to tower 35 is fractionated so as to produce (a) a first overhead product comprising a major portion of n-hexane, i.e., about 85 to 98% of the feed hexane, substantially all the water, and a major portion of the feed olefins having a boiling point near and below that of n-hexane, e.g., about 200 to 1000 p.p.m. by weight of hexenes and (b) a first bottoms product, which is essentially water-free, comprising the remainder of the feed hexane, and a major portion of feed olefins having a boiling point higher than that of n-hexane, i.e., about 0.5 to 1 wt. percent. In general, about 1 to 15 wt. percent, preferably 2 to 5 wt. percent of the stream fed to tower 35 is taken as a first bottoms product.

The first overhead product passes from tower 35 through line 36 into heat exchanger 37 through line 38 into reflux drum 39. A portion of the material contained in drum 39 is returned to tower 35 as reflux by way of line 40. The product remaining in drum 39 is fed to the top of distillation-drying tower 42 via line 41 to obtain a second overhead product and a second bottoms product. In an alternate mode of operation, at least a portion of the product in drum 39 is removed through line 43 and sent through line 44 into line 17 for use as supplementary hexane diluent in deasher 18. Additionally, at least a portion of the net product stream passing from drum 39 can be sent through line 43a into line 47 and admixed therein with the first gasiform phase from separator 32.

The first gasiform phase passes from separator 32 via line 45 into heat exchanger 46 which is operated at a temperature in the range of 70 to 120° F. and a pressure in the range of 5 to 50 p.s.i.g., thereby substantially liquefying that portion of the n-hexane which was not condensed in exchanger 30.

The effluent from exchanger 46 can be combined with a portion of the first overhead product from line 43a which was not recycled to deasher 18, and the combined mixture is fed to separator 48 via line 47 where it is separated into a second liquid water phase, a second diluent-rich organic phase and a second gasiform phase.

The second liquid water phase is removed from separator 48 via line 49 and may either be discarded or reutilized in deasher 18 or flash drum 25.

The second gasiform phase, consisting essentially of light olefins such as ethylene, propylene, organic chlorides, and portions of $C_4$ to $C_6$ olefinic by-products and minor amounts of n-hexane, is purged from separator 48 via line 50. The second gasiform phase may then be discarded or, if desired, may be subjected to purification processes well known in the art wherein additional amounts of the unreacted ethylene, propylene and n-hexane are recovered for reutilization in reactor 10 or for other uses.

At least a portion of the second liquid diluent-rich organic phase is removed from separator 48 via line 51 and sent through line 44 into line 17 so as to provide additional amounts of n-hexane diluent for use in dasher 18. Excess liquid in separator 48 may be diverted to drying tower 42 by way of lines 51, 41a, 41b and 41.

Since the stream passing through line 41a contains relatively more $C_7$-and-heavier olefins and diolefin than that passing from drum 39 through line 41 into drying tower 42, it can be desirable to dry the former stream separately rather than combine it with the latter stream. In such a case, all or part of the stream passing through line 41a is diverted through line 41b to the top of distillation drying tower 52 which operates at a temperature in the range of 160° to 275° F. and a pressure in the range of 5 to 70 p.s.i.g. The feed to tower 52 is then fractionated so as to provide a third bottoms product, and an overhead product which passes through line 53 into partial condenser 54 through line 55 into reflux drum 56. A liquid water phase contained in drum 56 is discarded via line 57. The total diluent-rich liquid product in drum 56 is refluxed back to tower 52 via line 58. The total gas-phase portion of the product in drum 56, consisting essentially of ethylene and propylene and containing minor amounts of $C_4$–$C_6$ olefinic by-products and n-hexane, is removed from drum 56 via line 59 and may be purged or separated into its individual components so as to recover additional amounts of ethylene, propylene and n-hexane for reuse in reactor 10. A minor portion of the third bottoms product, which is an essentially water-free stream comprising a major concentration of n-hexane and a minor concentration of $C_6$ and higher olefinic contaminants, passes through line 60 into reboiler 61 and is sent back to tower 52 through line 62. The remainder of the stream passing through line 60 is sent to line 70a where it may be admixed with at least a portion of the second bottoms product from tower 42 and returned to reactor 10.

Distillation drying tower 42, which is operated at 160° to 270° F. and 5 to 70 p.s.i.g., contains suitable vapor-liquid contacting devices of any type well known in the art as well as suitable reboiling means, 71. The feed to tower 42 is fractionated so as to provide a second overhead product which passes from tower 42 through line 63 into partial condenser 64 through line 65 into reflux drum 66. The liquid water phase contained in drum 66 is discarded via line 67. All of the diluent-rich organic liquid phase product in drum 66 is refluxed back to tower 42 via line 68. The gas-phase portion of the product in drum 66, consisting essentially of ethylene, propylene, and minor portions of $C_4$–$C_6$ olefins and n-hexane, may be purged through line 69 or separated into its individual components so as to recover additional amounts of ethylene, propylene and n-hexane for reuse in reactor 10 or elsewhere.

Part of the second bottoms product is withdrawn through line 70, sent to reboiler 71 and returned to tower 42 via line 72. The remainder of the second bottoms product, comprising a major concentration of n-hexane together with about 1–10 p.p.m. of water, 1–10 p.p.m. of any alcohol used for rejection of catalyst residues, 10–50 p.p.m. of propylene, 20–100 p.p.m. of $C_4$–$C_5$ olefins, 50–200 p.p.m. of organic chloride, 200–1000 p.p.m. of by-product olefins having a boiling point near that of n-hexane, 20–100 p.p.m. of olefins boiling higher than the diluent, and less than 100–300 p.p.m. of the unreacted 5–MNB, is sent through line 70. At least a portion of the second bottoms product in line 70 is passed into line 73 through heater 73a and then into hydrofiner 74. All of the second bottoms product passing through line 70 need not be hydrogenated in hydrofiner 74. For example, about 10 to 20% of the stream passing through line 70 can be diverted through line 70a to line 86 for reuse in reactor 10 without any hydrogenation, for better integrated control of towers 42 and 74.

Hydrofiner 74, which operates at a temperature in the range of 225–350° F., preferably 275–325° F., and a pressure in the range of 150 to 250 p.s.i.g., preferably 175 to 225 p.s.i.g., contains a typical hydrogenation catalyst, such as 50 to 75 wt. percent nickel-on-kieselguhr. Although this hydrogenation catalyst is preferred, any conventional nonselective hydrogenation catalyst known in the art can be used in hydrofiner 74. Other suitable nonlimiting examples of hydrogenation catalysts include palladium on charcoal, platinum on charcoal, cobalt on charcoal, nickel on charcoal, Raney nickel, nickel-alumina, nickel-tungsten, nickel-molybdenum, copper chromite, and the like.

The feed enters hydrofiner 74 through line 73, at the rate of 10 to 50 liquid volumes, preferably 20 to 40 liquid volumes, per hour per unit volume of fixed bed catalyst. Hydrogen is introduced through line 76 into hydrofiner 74 after admixture with the feed stream passing through line 73. In general, the amount of hydrogen employed in hydrofiner 74 is equivalent to 5 to 12 moles, preferably 8 to 10 moles, of hydrogen per mole of ethylenic unit present in the feed stream passing through line 73, i.e. 8 to 10 moles of hydrogen would be preferably employed per mole of any monoolefin and 16 to 20 moles of hydrogen would be preferably employed per mole of any diolefin present in the feed to hydrofiner 74.

If desired, anhydrous makeup n-hexane containing appreciable quantities of olefinic contaminants can be admitted to hydrofiner 74 so as to provide additional amounts of any n-hexane which has been lost during the process, i.e. due to purging of light olefins containing trace amounts of n-hexane, losses due to leakage, etc.

The hydrogenated portion of the second and third bottoms product, comprising a major concentration of n-hexane and a minor concentration of saturated isomers of n-hexane and higher boiling saturated hydrocarbons is removed from hydrofiner 74 and sent to the top of stripping tower 78 via line 77. Tower 78, which operates at a temperature in the range of 160° to 275° F. and a pressure in the range of 5 to 70 p.s.i.g., serves to reduce the excess dissolved hydrogen content of the feed hexane passing through line 77 to less than 1 p.p.m., by weight, of free hydrogen. The presence of $H_2$ in the diluent affects polymer product quality in reactor 10. The overhead product leaves tower 78 through line 79 and passes into partial condenser 80 and then to reflux drum 81. All of the diluent-rich liquid phase in drum 81 is refluxed to tower 78 via line 82. At least a portion of the hydrogen-rich gas phase from drum 81 is purged, via line 83, and the remaining portion may be recycled for reuse to tower 74 via line 83a and a compressor not shown.

A minor portion of the bottoms from tower 78 is sent through line 84 into reboiler 85 and back to tower 78 through line 86. The remaining bottoms product, which is essentially hydrogen-free and comprises a major amount of n-hexane and a minor amount of its saturated isomers and less than about 50 p.p.m., by weight, of olefins, is sent through line 84 to line 70a, cooled in heat exchanger 87 and returned to reactor zone 10 via line 88 with the third bottoms product in line 70a.

The third bottoms product from tower 52 will in general contain several times the concentration of unreacted 5–MNB and $C_7$-and-heavier olefins than present in the second bottoms product from tower 42. It is not desirable to consume the expensive diolefin by hydrogenation. Furthermore, as illustrated in Example 4, excessive $C_7$-and-heavier olefins in the feed to hydrofiner 74 deactivate the hydrogenation catalyst and reduce the efficiency of hydrogenating $C_4$–$C_6$ olefins, which is the primary purpose of tower 74. Thus, it is advantageous to dry the overhead product from tower 35 separately in tower 42 to provide optimum feed for hydrofiner 74. Additionally, the feed hexane in line 41a can also be dried in tower 42, and tower 52 eliminated, but at the expense of reduced hydrofining efficiency in tower 74. Alternately, any portion of the first overhead product in line 41, not needed for hydrofiner 74, may be dried in tower 52.

In drying towers 42 and 52, organic chlorides, water and $C_2$–$C_{37}$ olefinic monomers are stripped from the n-hexane and purged as net tower overhead products. Water and organic chlorides are poisons in the polymerization reactor 10, and should not be recycled in high p.p.m. concentrations in the diluent. It is desirable to strip $C_2$ and $C_3$ monomers to low concentrations in the tower 42 bottoms product to avoid excessive consumption of hydrogen and loss of olefin monomers in hydrofiner 74. Traces of alcohol from deasher 18, also a catalyst poison, are also taken overhead in towers 42 and 52.

Among the olefinic contaminants enumerated in Example 2 below, the higher boiling materials are the most potent polymerization catalyts poisons; e.g., hexenes are relatively mild poisons and heptenes intermediate in potency. Thus, whereas about 200 p.p.m. hexenes on diluent are produced in the reactor, 1000–1500 p.p.m. hexenes on diluent can be recycled to reactor 10 without excessive catalyst poisoning. This means that the quantity of n-hexane hydrofined in tower 74 need be only 15–50% of the total hexane feed to reactor 10, preferably 20–30%. On the other hand, whereas about 100 p.p.m. of heptenes on diluent are produced, it is desirable to limit the maximum recycle of $C_7$ olefins to about 150–200 p.p.m. on diluent.

Even lower percentages of C8-and-heavier olefins, relative to the quantities produced, are recycled to the reactor to minimize catalyst poisoning. It is desirable to limit the recycle of C9-and-heavier hydrocarbons for the added purpose of reducing product volatiles and "blistering" as defined above. These objectives can be realized by the steps described above, involving staged condensation of the polymerization diluent vapor from flash drum 25, fractionation of the first diluent-rich organic condensate which contains the bulk of the more potent C7-and-heavier olefins, in tower 35, and recycle of the diluent that is lean in C9-and-heavier hydrocarbons to the deaching step.

Part of the first bottoms product of tower 35 is sent through line 89 into reboiler 90 and returned to tower 35 through line 91. The remainder of the first bottoms product, comprising about 1 to 15%, preferably 2 to 5%, of the feed to tower 35, and containing about 0.5–1.0 wt. percent of the higher by-product olefins, 2–5 wt. percent unreacted 5-MNB and n-hexane, is sent to fractionating tower 93 via line 89, 89a, and 89b. If desired, the first bottoms product need not be distilled in tower 93 and may be purged and discarded through line 89a. The feed entering tower 93, which operates at a temperature in the range of 170° to 260° F. and a pressure in the range of 5 to 50 p.s.i.g., is fractionated so as to provide a fifth overhead product comprising n-hexane and major portions of C7-and-heavier olefinic by-products. The overhead product leaves tower 93 through line 94 and passes into heat exchanger 95 through line 96 and thence into reflux drum 97. Part of the fifth overhead product contained in drum 97 is refluxed back to tower 93 via line 98 and the remainder of the product in drum 97 is sent to line 99. At least a portion of the product in line 99 is purged via line 99a to reject C7-and-heavier olefins boiling above the diolefin monomer. Another portion of the overhead product in line 99 can be sent to line 88 for reuse in reactor 10. Alternatively, for maximum recovery and reuse of n-hexane, the total overhead product in line 99 may be fractionated in an additional tower not shown to separate n-hexane from C7-and-heavier olefins, the purified n-hexane fraction recycled to reactor 10, and the concentrated C7-and-heavier olefin fraction purged.

A portion of the fifth bottoms product is sent through line 100 into reboiler 101 and returned to tower 93 through line 102. The remainder of the fifth bottoms product is sent through line 100 to the top of distillation tower 103 which operates at a temperature in the range of 240° to 300° F. and a pressure in the range of 5 to 15 p.s.i.g. The feed to tower 103 is distilled so as to provide a sixth overhead product comprising unreacted 5–MNB monomer, isomers of 5–MNB, and olefinic contaminants boiling near 5–MNB. The products from tower 103 pass through line 104 into heat exchanger 105 and thence through line 106 into reflux drum 107. A portion of the sixth overhead product in drum 107 is refluxed to tower 103 through line 108 and the remainder of the product is sent to line 109. At least a portion of the 5–MNB product in line 109 is purged via line 109a in order to reject a portion of impurities present in the fresh 5–MNB feed introduced into reactor 10. The remaining 5–MNB product in line 109 is sent into line 13 for reuse in reactor zone 10.

A portion of the sixth bottoms product from tower 103 is removed via line 110, sent to reboiler 111 and returned to tower 103 through line 112. The remainder of the sixth bottoms product, consisting essentially of olefinic contaminants boiling above 5–MNB, 5–MNB dimer, trimer, etc., is purged and discarded through line 110.

A number of laboratory experiments, designated as Examples 1 to 5, were conducted to demonstrate the advantages of this invention:

EXAMPLE 1

A 2-liter, 4-neck glass reaction flask was fitted with a stainless steel agitator, thermometer, gas inlet and outlet tubes, and an opening to permit the introduction of liquid reagents. Nine hundred milliliters of anhydrous n-hexane, having a bromine index of substantially zero, was placed in the flask and the flask was cooled to 40° F. A vapor mixture of 68 mole percent propylene and 32 mole percent ethylene was introduced into the reaction flask below the liquid level of the n-hexane at the rate of 100 liters per hour. The contents of the flask were vigorously stirred, with cooling, and the n-hexane was saturated with the propylene-ethylene mixture for about 30 minutes.

Solutions of 0.165 g. (1.37 mmols) of aluminum diethylchloride in 50 ml. anhydrous n-hexane having a bromine index of substantially zero and 0.046 g. (0.24 mmols) of vanadium oxytrichloride in 50 ml. of anhydrous n-hexane having a bromine index of substantially zero were added rapidly, in turn, to the vigorously stirred reaction mixture. The reaction mixture was stirred for 1 hour at 40° F. during which time the propylene-ethylene feed mixture was continuously introduced at the rate of 100 liters per hour.

At the end of this time, the catalyst was deactivated by the addition of 10 ml. isopropanol and the resultant mixture was diluted with 2-liters of isopropanol containing 2 wt. percent of 2,2'-methylene bis(6-tert.-butyl-4-methylphenol), and stirred for 2 minutes in a Waring Blendor. The slurry was then filtered and the solid, rubbery copolymer was air dried at room temperature. The yield of ethylene/propylene copolymer was 28 grams.

EXAMPLE 2

Following the procedure as set forth in Example 1, an ethylene/propylene copolymer was prepared in the presence of anhydrous, alcohol-free n-hexane diluent which had been previously employed in the preparation of an ethylene/propylene copolymer. The n-hexane diluent employed in this run had a bromine index of 170 and was purified only to the extent that water and isopropanol was removed prior to its reuse (the bromine index is a number expressing the amount, i.e. milligrams of bromine absorbed per 100 grams of a substance and is a measure of the proportion of the unsaturated linkages, i.e. the olefins, present in the diluent). Many of the olefins comprising the bromine index of 170 were identified by gas chromatography and are listed together with their boiling points in Table I below.

Table I

| Olefin: | B.P., ° C. |
|---|---|
| Butene-1 | 6.3 |
| Cis-butene-2 | 3.7 |
| Pentene-1 | 30.0 |
| 2-methylbutene-1 | 31.2 |
| 2-methyl-pentene-1 | 62.1 |
| Hexene-1 | 63.5 |
| 2-methylhexene-1 | 92 |
| 2,4-dimethylhexene-1 | 111.2 |
| 2-methylheptene-1 | 119.3 |
| Octene-1 | 121.3 |
| 2,4-dimethylheptene-1 | 135 |
| 2-methyloctene-1 | 144.7 |

The copolymerization of ethylene and propylene with the diluent having a bromine index of 170 resulted in a yield of 20 g. of ethylene/propylene copolymer. This result, when compared with the yield of 28 g. of the ethylene/propylene copolymer obtained in Example 1, indicates that the olefins shown in Table I are potent catalytic poisons and must be removed from the diluent before it can be reused efficiently in the polymerization reaction with minimum consumption of the expensive catalysts.

EXAMPLE 3

Anhydrous n-hexane diluent having a bromine index of 240 due to C6-and-heavier olefins was hydrogenated using a catalyst consisting of 70 wt. percent nickel-on-kieselguhr at 300° F. and 200 p.s.i.g. Six moles of hydrogen per mole of olefinic impurity was employed and the space velocity for the hydrogenation was 40 liquid volumes per hour of diluent per unit bulk volume of nickel-on-kieselguhr. The resultant hydrogenated diluent, which had a bromine index of 51, was employed in the preparation of an ethylene/propylene copolymer using the procedure set forth in Example 1. The yield of copolymer was 24 grams. The yield of copolymer in this test was substantially higher than that obtained when the copolymer was prepared in the presence of a nonhydrogenated n-hexane diluent as is set forth in Example 2 above.

EXAMPLE 4

In order to demonstrate that an olefin having a boiling point near that of n-hexane is a catalytic poison, 0.75 wt. percent of 2-methyl-pentene-1 having a boiling point of 62.1° C. was added to pure, anhydrous n-hexane, giving a bromine index of 1440, and was employed in the preparation of an ethylene/propylene copolymer using the procedure set forth in Example 1. The yield of copolymer was 5 grams.

In a similar manner, an attempt was made to copolymerize ethylene with propylene in the presence of an anhydrous n-hexane diluent containing 1.0 wt percent 2-methyl-pentene-1. No copolymer was obtained in this experiment.

By comparison, the run was repeated with 0.1 wt. percent of octene-1 added to the pure, anhydrous n-hexane diluent. In this case, no copolymer was obtained. This result indicated that higher boiling olefins are more potent catalyst poisons than lower boiling olefins.

EXAMPLE 5

A portion of the anhydrous n-hexane used in Example 3, having a bromine index of 240, was distilled in a 30-plate Oldershaw column at a reflux ratio of 5:1. A bottoms stream constituting 2 wt. percent of the inlet feed mixture and having a bromine index of 5000 due to $C_{7}$- and-higher boiling olefins was removed from the fractionator. The overhead product, comprising 98% of the n-hexane which was placed in the column and having a bromine index of 140, was hydrogenated with 70 wt. percent nickel-on-kieselguhr at 300° F. and 200 p.s.i.g. Six moles of hydrogen per mole of olefinic impurities, largely hexenes, was employed and the rate of hydrogen input was 40 volumes of n-hexane per hour per volume of nickel-on-kieselguhr. The resultant hydrogenated diluent having a bromine index of less than 30 was then employed in the preparation of an ethylene/propylene copolymer, in the exact manner as used in Example 1. The yield of ethylene/propylene copolymer was 28 grams, which is the identical yield reported in Example 1 supra, thus indicating that this invention provides a satisfactory solution to the problem of olefin removal from the polymerization diluent prior to its reuse in the polymerization process.

It should be noted in comparing this example with Example 3 that the diluent activity was much better when removing $C_7$-and-heavier olefins by distillation than by hydrogenation. Furthermore, it has been found that the decline in hydrogenation catalyst activity is less rapid when olefins boiling above hexenes are removed from the hydrofiner feed.

The advantages of this invention will be apparent to those skilled in the art. The polymerization diluent and unreacted monomers are obtained in condition for reuse. Increased yields of polymer products are obtained with a net saving in cost because of the improved recycle diluent streams made available.

It is to be understood that this invention is not limited to the specific examples which have been offered merely as illustrations and that modifications may be made without departing from the spirit of the invention.

What is claimed is:

1. In a process for polymerizing olefins in the presence of a saturated hydrocarbon diluent and a Ziegler polymerization catalyst and upon completion of the polymerization reaction the reaction mixture is treated for the removal of catalyst residues and then contacted with steam thereby obtaining a slurry of the essentially residue-free polymer and a vaporized hydrocarbon mixture comprising hydrocarbon diluent, unreacted olefins, and reaction by-products, the improvement which comprises:
    (a) separating a hydrocarbon diluent-rich organic phase from said hydrocarbon mixture;
    (b) distilling at least a portion of said hydrocarbon diluent-rich organic phase and recovering as an overhead product from said distillation a portion of said hydrocarbon diluent and reaction by-products olefins having boiling points near and below that of the saturated hydrocarbon diluent;
    (c) hydrogenating at least a portion of said overhead product to substantially saturate the olefins contained in said overhead product;
    (d) stripping at least a major portion of the unreacted hydrogen from said hydrogenated overhead product; and
    (e) recycling at least a portion of said stripped hydrogenated mixture to the polymerization reaction zone.

2. In a process for polymerizing olefins in the presence of a saturated hydrocarbon diluent and a catalyst comprising:
    (1) reducible transition metal compound and
    (2) an organometal compound, wherein upon completion of the polymerization reaction the reaction mixture is treated for removal of catalyst residues and then contacted with steam thereby obtaining a slurry of the deashed polymer and a vaporized hydrocarbon mixture comprising hydrocarbon diluent, unreacted olefins, and reaction by-products, the improvement which comprises:
    (a) separating a hydrocarbon diluent-rich organic phase from said vaporized hydrocarbon mixture;
    (b) distilling at least a portion of the hydrocarbon diluent-rich organic phase to take as an overhead product a stream comprising a major portion of said saturated hydrocarbon diluent in high concentration and a major portion of olefins in low concentration having a boiling point near and below that of said saturated hydrocarbon diluent, and as a bottoms product a stream comprising a major portion of olefins in low concentration having a boiling point higher than that of said saturated hydrocarbon diluent and a minor portion of said saturated hydrocarbon diluent in relatively high concentration;
    (c) drying, stripping and hydrogenating at least part of the overhead product thereby obtaining a hydrogenated mixture comprising largely said saturated hydrocarbon diluent and saturated isomers of said saturated hydrocarbon diluent;
    (d) drying and recycling the nonhydrogenated portion of the overhead product to the polymerization reaction zone;
    (e) stripping at least a major portion of unreacted hydrogen from said hydrogenated overhead product; and
    (f) recycling at least a portion of said stripped hydrogenated mixture to the polymerization reaction zone.

3. In a process for polymerizing ethylene with at least one other polymerizable olefin in the presence of a saturated hydrocarbon diluent having from 5 to 8 carbon atoms and a catalyst comprising:
    (1) a vanadium compound having the formula $VO_nX_{4-n}$ where $n$ is an integer of zero to one and X is a halogen having an atomic number of at least 17; and
    (2) an organoaluminum compound having the general formula $R_{3-z}AlX_z$ where R is an alkyl radical having from 1 to 12 carbon atoms, X is a halogen having an atomic number of at least 17 and z is an integer of zero to two, wherein upon completion of the polymerization reaction the reaction mixture is treated for removal of catalyst residues in the presence of an additional amount of said saturated hydrocarbon diluent and then contacted with steam thereby obtaining a slurry of the deashed copolymer and a vaporized hydrocarbon mixture comprising hydrocarbon diluent, unreacted olefins, and reaction by-products, the improvement which comprises:

(a) condensing a portion of said vaporized hydrocarbon diluent mixture;

(b) separating the partially condensed vaporized hydrocarbon diluent mixture into a first liquid water phase, a first liquid diluent-rich organic phase and a first gasiform phase;

(c) distilling in a first distillation zone the first liquid diluent-rich organic phase to take as a first overhead product a stream containing major portions of said saturated hydrocarbon diluent, water, organic chlorides and olefins having a boiling point near and below that of said saturated hydrocarbon diluent, and as a first bottoms product an essentially water-free stream comprising a major portion of olefins having a boiling point higher than that of said saturated hydrocarbon diluent and a minor portion of said saturated hydrocarbon diluent;

(d) distilling in a second distillation zone at least part of the first overhead product to take as a second overhead product a stream comprising water, organic chlorides and olefins having a boiling point lower than that of said saturated hydrocarbon diluent and a minor portion of the diluent, and as a second bottoms product a stream comprising a major portion of said saturated hydrocarbon diluent and a major portion of olefins having a boiling point near that of said saturated hydrocarbon diluent;

(e) hydrogenating at least part of the second bottoms product in the presence of a hydrogenation catalyst so as to obtain a hydrogenated mixture comprising essentially said saturated hydrocarbon diluent and saturated isomers of said saturated hydrocarbon diluent;

(f) recycling the nonhydrogenated portion of the second bottoms product to the polymerization reaction zone; and (g) stripping the excess dissolved hydrogen from said hydrogenated mixture and recycling the essentially hydrogen-free hydrogenated mixture to the polymerization reaction zone.

4. The process of claim 3 including the additional steps of:

(a) condensing at least a portion of the first gasiform phase that was not originally condensed and introduced into the first distillation zone;

(b) separating the partially condensed first gasiform phase into a second liquid water phase, a second liquid diluent-rich organic phase and a second gasiform phase;

(c) recycling at least part of the second diluent-rich organic phase to the catalyst residue removal step; and (d) drying, stripping and recycling at least a part of the second diluent-rich organic phase to the polymerization reaction zone.

5. The process of claim 2 including the additional step of recycling at least part of the first overhead product to the catalyst residue removal step.

6. The process of claim 3 wherein ethylene is copolymerized with an alpha olefin having from 3 to 10 carbon atoms, said alpha olefin differing in boiling point with the said diluent of 5 to 8 carbon atoms.

7. The process of claim 3 wherein ethylene is copolymerized with an alpha olefin having from 3 to 6 carbon atoms and a nonconjugated diolefin having from 6 to 16 carbon atoms and said diluent boils intermediate between said diolefin and alpha olefin.

8. The process of claim 7 including the additional step of distilling at least part of the first bottoms product so as to recover, as a third overhead product, a stream comprising said saturated hydrocarbon diluent which is then recycled to the polymerization reaction zone, and as a third bottoms product a mixture comprising unreacted nonconjugated diolefin and olefins having a boiling point higher than that of said saturated hydrocarbon diluent.

9. The process of claim 8 including the additional steps of distilling the third bottoms product so as to recover the unreacted nonconjugated diolefin substantially free of near-boiling olefins and recycling the recovered diolefin to the polymerization reaction zone.

10. The process of claim 3 wherein the saturated hydrocarbon diluent is n-hexane.

11. The process of claim 6 wherein the alpha olefin is propylene and the nonconjugated diolefin is 5-methylene-2-norbornene.

12. The process of claim 6 wherein the alpha olefin is propylene and the nonconjugated diolefin is dicyclopentadiene.

13. The process of claim 3 wherein the vanadium compound is vanadium oxytrichloride.

14. The process of claim 3 wherein the vanadium compound is vanadium tetrachloride.

15. The process of claim 3 wherein the organoaluminum compound is aluminum diethylchloride.

16. The process of claim 3 wherein the hydrogenation catalyst is nickel-on-kieselguhr.

References Cited
UNITED STATES PATENTS

| | | | |
|---|---|---|---|
| 2,726,231 | 12/1955 | Field et al. | 260—94.9 |
| 3,036,137 | 5/1962 | Challis et al. | 260—677 |
| 3,152,981 | 10/1964 | Berlin | 208—264 |

JOSEPH L. SCHOFER, *Primary Examiner.*

M. B. KURTZMAN, *Assistant Examiner.*